United States Patent
Nakajima et al.

(10) Patent No.: US 8,716,408 B2
(45) Date of Patent: *May 6, 2014

(54) METHOD FOR PRODUCING MODIFIED PROPYLENE POLYMER

(75) Inventors: Hiroyoshi Nakajima, Ichihara (JP); Mitsuyoshi Shimano, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/425,595

(22) Filed: Mar. 21, 2012

(65) Prior Publication Data

US 2012/0245296 A1 Sep. 27, 2012

(30) Foreign Application Priority Data

Mar. 25, 2011 (JP) ................................. 2011-067568

(51) Int. Cl.
*C08F 8/00* (2006.01)
*C08F 8/02* (2006.01)

(52) U.S. Cl.
USPC ............................. 525/263; 525/265; 525/387

(58) Field of Classification Search
USPC .......................................... 525/263, 387, 265
See application file for complete search history.

(56) References Cited

U.S. PATENT DOCUMENTS

| | | | |
|---|---|---|---|
| 4,735,988 A * | 4/1988 | Takada et al. | 524/504 |
| 6,103,833 A | 8/2000 | Hogt et al. | |
| 6,919,410 B2 | 7/2005 | Kitano | |
| 2002/0161131 A1 * | 10/2002 | Kitano et al. | 525/263 |
| 2012/0245297 A1 * | 9/2012 | Nakajima et al. | 525/263 |
| 2012/0245302 A1 * | 9/2012 | Nakajima et al. | 525/387 |

FOREIGN PATENT DOCUMENTS

| | | |
|---|---|---|
| JP | 2007-130992 A | 5/2007 |
| JP | 2009-179665 A | 8/2009 |

OTHER PUBLICATIONS

Lazar et al, "Functionalization of isotactic poly(propylene) with maleic anhydride in the solid phase," Die Angewandte Makromolekulare Chemie, vol. 243, No. 4236, pp. 57-67 (1996).
U.S. Appl. No. 13/425,556 by Nakajima et al, filed Mar. 21, 2012.
U.S. Appl. No. 13/425,611 by Nakajima et al, filed Mar. 21, 2012.
Office Action issued Oct. 24, 2012 in U.S. Appl. No. 13/425,556.
Office Action issued Oct. 17, 2012 in U.S. Appl. No. 13/425,611.
Office Action issued May 20, 2013 in U.S. Appl. No. 13/425,556.
Office Action issued May 16, 2013 in U.S. Appl. No. 13/425,611.

* cited by examiner

*Primary Examiner* — Mark Kaucher
(74) *Attorney, Agent, or Firm* — Panitch Schwarze Belisario & Nadel LLP

(57) ABSTRACT

Disclosed is a method for producing a modified propylene polymer that exhibits low flowability and also exhibits little fluctuation in melt flow rate compared with the melt flow rate of the propylene polymer before modification, the method involving a heat treatment step of subjecting a mixture comprising 100 parts by weight of a propylene polymer (A), from 0.1 to 50 parts by weight of an ethylenically unsaturated bond-containing compound (B), and from 0.01 to 20 parts by weight of an organic peroxide (C) whose decomposition temperature at which the half-life thereof becomes 1 minute is lower than 120° C. to heat treatment by using an extruder at a temperature lower than the decomposition temperature of the organic peroxide (C) at which the half-life thereof becomes 1 minute.

6 Claims, No Drawings

METHOD FOR PRODUCING MODIFIED PROPYLENE POLYMER

BACKGROUND OF THE INVENTION

1. Field of the Invention

The present invention relates to a method for producing a modified propylene polymer.

2. Description of Related Art

It has been known to obtain a modified propylene polymer by grafting a polar monomer, such as maleic anhydride and glycidyl methacrylate, to a propylene polymer.

As a method for producing a modified propylene polymer, for example, patent document 1 discloses a method of obtaining a modified propylene polymer by melt mixing a mixture containing a polypropylene resin (A), an unsaturated carboxylic acid and/or a derivative thereof (B), and an organic peroxide (C) having a one-minute half-life temperature of from 100° C. to 150° C. and having a peroxyester structure or diacylperoxide structure at a temperature higher than the melting point of the polypropylene resin (A).

Moreover, non-patent document 1 discloses a method of reacting maleic anhydride and an organic peroxide to a propylene polymer in an organic solvent, thereby grafting maleic anhydride to the propylene polymer.

RELATED ART DOCUMENTS

Patent Documents

[Patent Document 1] JP 2009-179665 A
[Non-patent Document 1] Die Angewandte Makromolekulare Chemie, 243, 57 (1996)

However, if the use of the method disclosed in patent document 1, molecular chains of a propylene polymer will be broken in parallel with the grafting reaction of maleic anhydride. For this reason, the molecular weight of a modified propylene polymer to be obtained may become remarkably low than the molecular weight of the propylene polymer before the modification or the flowability (melt flow rate) may increase remarkably. Therefore, the mechanical properties which propylene polymers inherently have may be impaired greatly. On the other hand, the method disclosed in non-patent document 1 is not necessarily effective from an industrial point of view because the production process thereof is complicated due to the grafting reaction carried out in an organic solvent.

In light of the above-described problems, the object of the present invention is to provide a method for producing a modified propylene polymer that exhibits low flowability and also exhibits little fluctuation in melt flow rate compared with the melt flow rate of the propylene polymer before modification.

SUMMARY OF THE INVENTION

The present invention provides a method for producing a modified propylene polymer, the method comprising a heat treatment step of subjecting a mixture comprising 100 parts by weight of a propylene polymer (A), from 0.1 to 50 parts by weight, based on said 100 parts by weight, of an ethylenically unsaturated bond-containing compound (B), and from 0.01 to 20 parts by weight, based on said 100 parts by weight, of an organic peroxide (C) whose decomposition temperature at which the half-life thereof becomes 1 minute is lower than 120° C. to heat treatment by using an extruder at a temperature lower than the decomposition temperature of the organic peroxide (C) at which the half-life thereof becomes 1 minute.

According to the present invention, it becomes possible to provide a method for producing a modified propylene polymer that exhibits low flowability and also exhibits little fluctuation in melt flow rate compared with the melt flow rate of the propylene polymer before modification.

DESCRIPTION OF THE PREFERRED EMBODIMENTS

[Method for Producing of a Modified Propylene Polymer]

The method for producing a modified propylene polymer according to the present invention has a heat treatment step of heat treating a mixture containing a propylene polymer (A), an ethylenically unsaturated bond-containing compounds (B) and an organic peroxide (C) at a prescribed temperature by using an extruder. The mixture is preferably obtained by the following mixing step.

[Mixing Step]

The mixing step is a step of mixing 100 parts by weight of the propylene polymer (A) described below, from 0.1 to 50 parts by weight, based on said 100 parts by weight, of an ethylenically unsaturated bond-containing compounds (B), and from 0.01 to 20 parts by weight, based on said 100 parts by weight, of an organic peroxide (C). It is preferred to mix the respective ingredients uniformly by using a device such as a Henschel mixer and a blender. The mixing of the ingredients is carried out preferably at a temperature lower than the decomposition of the organic peroxide (C) at which the half-life thereof becomes 1 minute, preferably for 1 second to 1 hour, more preferably from 1 to 5 minutes.

<Propylene Polymer (A)>

The propylene polymer (A) to be used in the present invention refers to a propylene homopolymer or a copolymer of propylene with other monomers. These may be used singly or alternatively two or more of them may be blended for use. The aforementioned copolymer may be either a random copolymer or a block copolymer.

Examples of the random copolymer include a random copolymer composed of constitutional units derived from propylene and constitutional units derived from ethylene; a random copolymer composed of constitutional units derived from propylene and constitutional units derived from an α-olefin other than propylene; and a random copolymer composed of constitutional units derived from propylene, constitutional units derived from ethylene, and constitutional units derived from an α-olefin other than propylene.

Examples of the block copolymer include a polymeric material composed of a propylene homopolymer component or a polymer component composed of constitutional units derived from propylene (hereinafter referred to as polymer component (I)) and a copolymer component of propylene with ethylene and/or an α-olefin (hereinafter referred to as polymer component (II)).

From the viewpoint of the balance between the tensile strength and the impact resistance of the resin composition, the propylene polymer (A) preferably has an isotactic pentad fraction (sometimes written [mmmm] fraction) measured by $^{13}$C-NMR of 0.97 or more, more preferably 0.98 or more. It is a measure which indicates that the closer to 1 the isotactic pentad fraction of a propylene polymer (A) is, the higher is the regioregularity of the molecular structure of the highly crystalline polymer.

When the propylene polymer (A) is a random copolymer like that mentioned above or a block copolymer like that mentioned above, a value measured for a chain of propylene units in the copolymer is used.

The melt flow rate (MFR) of the propylene copolymer (A) measured at 230° C. under a load of 2.16 kg is preferably from 0.05 to 500 g/10 minutes, more preferably from 1 to 120 g/10 minutes, even more preferably from 1 to 80 g/10 minutes, and most preferably from 5 to 50 g/10 minutes from the viewpoint of the balance between the tensile strength and the impact resistance of a resulting molded article and the molding processability of the resin composition.

The propylene polymer (A) can be produced by a method described below using a conventional polymerization catalyst.

Examples of the polymerization catalyst include Ziegler type catalyst systems, Ziegler-Natta type catalyst systems, catalyst systems composed of an alkyl aluminoxane and a compound of a transition metal of Group 4 of the periodic table which compound has a cyclopentadienyl ring, catalyst systems composed of an organoaluminum compound, a compound of a transition metal of Group 4 of the periodic table which compound has a cyclopentadienyl ring, and a compound capable of reacting with the compound of the transition metal to form an ionic complex, and catalyst systems prepared by modifying catalyst components such as a compound of a transition metal of Group 4 of the periodic table which compound has a cyclopentadienyl ring, a compound capable of forming an ionic complex, and an organoaluminum compound by supporting them on inorganic particles such as silica and clay mineral. Preliminarily polymerized catalysts which are prepared by preliminarily polymerizing ethylene or an α-olefin in the presence of the aforementioned catalyst systems may also be used.

Specific examples of the catalyst systems include the catalyst systems disclosed in JP 61-218606 A, JP 5-194685 A, JP 7-216017 A, JP 9-316147 A, JP 10-212319 A, and JP 2004-182981 A.

Examples of the polymerization method include bulk polymerization, solution polymerization, slurry polymerization, and vapor phase polymerization. The bulk polymerization is a method in which polymerization is carried out using, as a medium, an olefin that is liquid at the polymerization temperature, and the solution polymerization or the slurry polymerization is a method in which polymerization is carried out in an inert hydrocarbon solvent such as propane, butane, isobutane, pentane, hexane, heptane, and octane. The gas phase polymerization is a method in which a gaseous monomer is used as a medium and a gaseous monomer is polymerized in the medium.

Such polymerization methods may be conducted either in a batch system or in a multistage system using a plurality of polymerization reactors linked in series and these polymerization methods may be combined optionally. From the industrial and economical point of view, a continuous vapor phase polymerization method or a bulk-vapor phase polymerization method in which a bulk polymerization method and a vapor phase polymerization method are used continuously is preferred.

The conditions of each polymerization step (polymerization temperature, polymerization pressure, monomer concentration, amount of catalyst to be charged, polymerization time, etc.) may be determined appropriately depending on the desired propylene polymer (A).

In the production of the propylene polymer (A), in order to remove a residual solvent contained in the propylene polymer (A) or ultra-low molecular weight oligomers formed during the production, the propylene polymer (A) may be dried at a temperature not higher temperature at which the propylene polymer (A) melts, if necessary. Examples of the drying method include those disclosed in JP 55-75410 A and JP 2565753.

Random Copolymer

As described above, the random copolymer in the present invention includes random copolymers composed of constitutional units derived from propylene and constitutional units derived from ethylene; random copolymers composed of constitutional units derived from propylene and constitutional units derived from an α-olefin other than propylene; and random copolymers composed of constitutional units derived from propylene, constitutional units derived from ethylene, and constitutional units derived from an α-olefin other than propylene.

The α-olefin other than propylene which constitutes the random copolymer is preferably an α-olefin having from 4 to 10 carbon atoms, examples of which include 1-butene, 1-pentene, 1-hexene, 4-methyl-1-pentene, 1-octene and 1-decene and are preferably 1-butene, 1-hexene or 1-octene.

Examples of the random copolymer composed of constitutional units derived from propylene and constitutional units derived from α-olefin include propylene-1-butene random copolymers, propylene-1-hexene random copolymers, propylene-1-octene random copolymers, and propylene-1-decene random copolymers.

Examples of the random copolymer composed of constitutional units derived from propylene, constitutional units derived from ethylene, and constitutional units derived from an α-olefin include propylene-ethylene-1-butene random copolymers, propylene-ethylene-1-hexene random copolymers, propylene-ethylene-1-octene random copolymers, and propylene-ethylene-1-decene random copolymers.

The content of the constitutional units derived from ethylene and/or the α-olefin in the random copolymer is preferably from 0.1 to 40% by weight, more preferably from 0.1 to 30% by weight, and even more preferably from 2 to 15% by weight. The content of the constitutional units derived from propylene is preferably from 99.9 to 60% by weight, more preferably from 99.9 to 70% by weight, and even more preferably from 98 to 85% by weight.

Block Copolymer

As described above, the block copolymer in the present invention refers to a polymeric material composed of a propylene homopolymer component or a polymer component composed of constitutional units derived from propylene ((hereinafter referred to as polymer component (I)) and a copolymer component of propylene with ethylene and/or an α-olefin (hereinafter referred to as polymer component (II)).

The polymer component (I) is a propylene homopolymer component or a polymer component composed of constitutional units derived from propylene. Examples of the polymer component composed of constitutional units derived from propylene include a propylene copolymer component composed of units derived from at least one comonomer selected from the group consisting of ethylene and α-olefins having from 4 to 10 carbon atoms and units derived from propylene.

When the polymer component (I) is a polymer component composed of constitutional units derived from propylene, the content of the units derived from at least one comonomer selected from the group consisting of ethylene and α-olefins having from 4 to 10 carbon atoms is 0.01% by weight or more and less than 20% by weight where the weight of the polymer component (I) shall be 100% by weight.

1-Butene, 1-hexene, and 1-octene are preferred as the α-olefin having from 4 to 10 carbon atoms and 1-butene is more preferred.

Examples of the polymer component composed of constitutional units derived from propylene include propylene-ethylene copolymer components, propylene-1-butene copolymer components, propylene-1-hexene copolymer components, propylene-1-octene copolymer components, propylene-ethylene-1-butene copolymer components, propylene-ethylene-1-hexene copolymer components, and propylene-ethylene-1-octene copolymer components.

Examples of the polymer component (I) preferably include propylene homopolymer components, propylene-ethylene copolymer components, propylene-1-butene copolymer components, and propylene-ethylene-1-butene copolymer components.

The polymer component (II) is a copolymer component composed of constitutional units derived from at least one comonomer selected from the group consisting of ethylene and α-olefins having from 4 to 10 carbon atoms and constitutional units derived from propylene.

The content of the units derived from at least one comonomer selected from the group consisting of ethylene and α-olefins having from 4 to 10 carbon atoms contained in the polymer component (II) is from 20 to 80% by weight, preferably from 20 to 60% by weight, and more preferably from 30 to 60% by weight where the weight of the polymer component (II) shall be 100% by weight.

Examples of the α-olefin having from 4 to 10 carbon atoms that constitutes the polymer component (II) include the same α-olefins as the α-olefins having from 4 to 10 carbon atoms that constitute the aforementioned polymer component (I).

Examples of the polymer component (II) include propylene-ethylene copolymer components, propylene-ethylene-1-butene copolymer components, propylene-ethylene-1-hexene copolymer components, propylene-ethylene-1-octene copolymer components, propylene-ethylene-1-decene copolymer components, propylene-1-butene copolymer components, propylene-1-hexene copolymer components, propylene-1-octene copolymer components, and propylene-1-decene copolymer components; propylene-ethylene copolymer components, propylene-1-butene copolymer components, and propylene-ethylene-1-butene copolymer component are preferred, and propylene-ethylene copolymer components are more preferred.

The content of the polymer component (II) of the polymeric material composed of the polymer component (I) and the polymer component (II) is preferably from 1 to 50% by weight, more preferably from 1 to 40% by weight, even more preferably from 10 to 40% by weight, and most preferably from 10 to 30% by weight where the weight of the propylene polymer (A) shall be 100% by weight.

When the polymer component (I) of the propylene copolymer composed of the polymer component (I) and the polymer component (II) is a propylene homopolymer component, examples of the propylene copolymer include (propylene)-(propylene-ethylene) copolymers, (propylene)-(propylene-ethylene-1-butene) copolymers, (propylene)-(propylene-ethylene-1-hexene) copolymers, (propylene)-(propylene-ethylene-1-octene) copolymers, (propylene)-(propylene-1-butene) copolymers, (propylene)-(propylene-1-hexene) copolymers, (propylene)-(propylene-1-octene) copolymers, and (propylene)-(propylene-1-decene) copolymers.

When the polymer component (I) of the polymeric material composed of the polymer component (I) and the polymer component (II) is a propylene copolymer component composed of units derived from propylene, examples of the propylene copolymer composed of the polymer component (I) and the polymer component (II) include (propylene-ethylene)-(propylene-ethylene) copolymers, (propylene-ethylene)-(propylene-ethylene-1-butene) copolymers, (propylene-ethylene)-(propylene-ethylene-1-hexene) copolymers, (propylene-ethylene)-(propylene-ethylene-1-octene) copolymers, (propylene-ethylene)-(propylene-ethylene-1-decene) copolymers, (propylene-ethylene)-(propylene-1-butene) copolymers, (propylene-ethylene)-(propylene-1-hexene) copolymers, (propylene-ethylene)-(propylene-1-octene) copolymers, (propylene-ethylene)-(propylene-1-decene) copolymers, (propylene-1-butene)-(propylene-ethylene) copolymers, (propylene-1-butene)-(propylene-ethylene-1-butene) copolymers, (propylene-1-butene)-(propylene-ethylene-1-hexene) copolymers, (propylene-1-butene)-(propylene-ethylene-1-octene) copolymers, (propylene-1-butene)-(propylene-ethylene-1-decene) copolymers, (propylene-1-butene)-(propylene-1-butene) copolymers, (propylene-1-butene)-(propylene-1-hexene) copolymers, (propylene-1-butene)-(propylene-1-octene) copolymers, (propylene-1-butene)-(propylene-1-decene) copolymers, (propylene-1-hexene)-(propylene-1-hexene) copolymers, (propylene-1-hexene)-(propylene-1-octene) copolymers, (propylene-1-hexene)-(propylene-1-decene) copolymers, (propylene-1-octene)-(propylene-1-octene) copolymers, and (propylene-1-octene)-(propylene-1-decene) copolymers.

Preferred examples of the propylene copolymer composed of the polymer component (I) and the polymer component (II) include (propylene)-(propylene-ethylene) copolymers, (propylene)-(propylene-ethylene-1-butene) copolymers, (propylene-ethylene)-(propylene-1-ethylene) copolymers, (propylene-ethylene)-(propylene-1-ethylene-1-butene) copolymers, and (propylene-1-butene)-(propylene-1-butene) copolymer, and (propylene)-(propylene-ethylene) copolymers are more preferred.

The intrinsic viscosity ($[\eta]_I$) of the polymer component (I) measured in tetralin of 135° C. is from 0.1 to 5 dl/g, preferably from 0.3 to 4 dl/g, and more preferably from 0.5 to 3 dl/g.

The intrinsic viscosity ($[\eta]_{II}$) of the polymer component (II) measured in tetralin of 135° C. is from 1 to 20 dl/g, preferably from 1 to 10 dl/g, and more preferably from 2 to 7 dl/g.

The ratio of the intrinsic viscosity of the polymer component (II) ($[\eta]_{II}$) to the intrinsic viscosity of the polymer component (I) ($[\eta]_I$) is preferably from 1 to 20, more preferably from 2 to 10, and even more preferably from 2 to 9.

The intrinsic viscosity (unit: dl/g) in the present invention is a value measured by the method described below at a temperature of 135° C. using tetralin as a solvent.

Reduced viscosities are measured at three concentrations of 0.1 g/dl, 0.2 g/dl and 0.5 g/dl by using a Ubbelohde's viscometer. The intrinsic viscosity is calculated by the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), namely, by an extrapolation method in which reduced viscosities are plotted against concentrations and the concentration is extrapolated to zero.

When the propylene polymer (A) is a polymeric material to be obtained by producing the polymer component (I) and the polymer component (II) by multistage polymerization, the intrinsic viscosity of the polymer component (I) or the polymer component (II) is determined using a polymer powder extracted from the polymerization vessel of the first stage and then the intrinsic viscosity of the remaining component is calculated from the value of the previously determined intrinsic viscosity and the contents of the respective components.

Moreover, when the propylene copolymer composed of the polymer component (I) and the polymer component (II) is a copolymer such that the polymer component (I) is obtained by the polymerization step of the earlier stage and the polymer component (II) is obtained in the latter step, the procedures of the measurement and the calculation of the contents of the polymer component (I) and the polymer component (II) and the intrinsic viscosities ($[\eta]_{Total}$, $[\eta]_I$, $[\eta]_{II}$) are as follows. The intrinsic viscosity ($[\eta]_{Total}$) represents the intrinsic viscosity of the whole propylene polymer (A).

From the intrinsic viscosity of the polymer component (I) obtained by the polymerization step of the earlier stage ($[\eta]_I$), the intrinsic viscosity of the final polymer after the polymerization step of the latter stage (component (I) and component (II)) measured by the above-described method ($[\eta]_{Total}$), and the content of the polymer component (II) contained in the final polymer, the intrinsic viscosity of the polymer component (II) $[\eta]_{II}$ is calculated from the following formula:

$$[\eta]_{II}=([\eta]_{Total}-[\eta]_I \times XI)/XII$$

$[\eta]_{Total}$: the intrinsic viscosity (dl/g) of the final polymer after the polymerization step of the latter stage $[\eta]_I$: the intrinsic viscosity (dl/g) of a polymer powder extracted from a polymerization reactor after the polymerization step of the earlier stage XI: the weight ratio of polymer component (I) to the whole propylene polymer (A)

XII: the weight ratio of polymer component (II) to the whole propylene polymer (A)

XI and XII are calculated from the mass balance in the polymerizations.

The weight ratio (XII) of the polymer component (II) to the whole portion of the propylene polymer (A) can be determined by measuring the heat of crystal fusion of the propylene homopolymer component and that of the whole portion of the propylene polymer (A), followed by a calculation using the following formula. The heat of crystal fusion can be measured by differential scanning calorimetry (DSC).

$$XII=1-(\Delta Hf)_{Total}/(\Delta Hf)$$

$(\Delta Hf)_{Total}$: Heat of fusion (cal/g) of the whole portion of the propylene polymer (A)

$(\Delta Hf)$: Heat of fusion (cal/g) of the propylene homopolymer component

The content ($(C\alpha')_{II}$) of the units derived from the comonomers of the polymer component (II) in the propylene polymer (A) was determined by measuring the content $(C\alpha')_{Total}$ of the units derived from the comonomers of the whole portion of the propylene polymer (A) by the infrared absorption spectrum method, followed by a calculation using the following formula.

$$(C\alpha')_{II}=(C\alpha')_{Total}/XII$$

$(C\alpha')_{Total}$: Content (% by weight) of the units derived from the comonomers of the whole portion of the propylene polymer (A)

$(C\alpha')_{II}$: Content (% by weight) of the units derived from the comonomers of the polymer component (II)

The block copolymer is obtained by producing the polymer component (I) in the first step and then producing the polymer component (II) in the second step. The polymerization is carried out using the above-described polymerization catalyst.

<Ethylenically Unsaturated Bond-containing Compound (B)>

The ethylenically unsaturated bond-containing compound (B) to be used in the present invention is a compound that has at least one ethylenically unsaturated bond and at least one kind of polar group. Examples thereof include unsaturated carboxylic acids and/or derivatives thereof, such as unsaturated carboxylic acids, ester compounds of unsaturated carboxylic acids, amide compounds of unsaturated carboxylic acids, and anhydrides of unsaturated carboxylic acids, unsaturated epoxy compounds, unsaturated alcohols, and unsaturated amine compounds.

More specific examples of the ethylenically unsaturated bond-containing compound (B) include:

(1) maleic acid, maleic anhydride, fumaric acid, maleimide, maleic hydrazide, methyl nadic anhydride, dichloromaleic anhydride, maleic amide, itaconic acid, itaconic anhydride, glycidyl (meth)acrylate, 2-hydroxyethyl methacrylate and allyl glycidyl ether, (2) unsaturated carboxylic acids, such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, a 2,4-hexadienoic acid, diallylacetic acid, geranium acid, 2,4-decadienoic acid, 2,4-dodecadienoic acid, 9,12-hexadecadienoic acid, 9,12-octadecadienoic acid, hexadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid, and tetracontenoic acid, (3) ester compounds, amide compounds or anhydrides of the above-mentioned unsaturated carboxylic acids, (4) unsaturated alcohols such as allyl alcohol, crotyl alcohol, methylvinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol, and 2,4-hexadien-1-ol, (5) unsaturated alcohols such as 3-butene-1,2-diol, 2,5-dimethyl-3-hexene-2,5-diol, 1,5-hexadiene-3,4-diol and 2,6-octadiene-4,5-diol, and (6) unsaturated amines resulting from replacing the hydroxy groups of the above unsaturated alcohols with an amino group.

The ethylenically unsaturated bond-containing compound (B) is preferably an unsaturated carboxylic acid and/or a derivative thereof, such as maleic anhydride, maleic acid, fumaric acid, itaconic anhydride, itaconic acid, glycidyl (meth)acrylate, and 2-hydroxyethyl methacrylate, and maleic anhydride is particularly preferred.

The added amount of the ethylenically unsaturated bond-containing compound (B) is from 0.1 to 50 parts by weight based on 100 parts by weight of the propylene polymers (A), preferably from 0.1 to 20 parts by weight, more preferably from 0.1 to 10 parts by weight, and most preferably from 0.1 to 5 parts by weight. If the added amount is less than 0.1 parts by weight, the grafted ratio of the resulting modified propylene polymer to be obtained may lower. If the added amount exceeds 50 parts by weight, a bad influence may be exerted upon productivity, for example, an extruder will corrode during the grafting reaction.

<Organic Peroxide (C)>

The organic peroxide (C) to be used in the present invention is an organic peroxide which decomposes to generate a radical and then works to remove a proton from the propylene polymer (A) and whose decomposition temperature at which the half-life thereof becomes 1 minute is lower than 120° C. In view of the action to remove a proton at the heat treatment temperature of the present invention, the organic peroxide (C) is preferably one whose decomposition temperature at which the half-life thereof becomes 1 minute is lower than 120° C., more preferably lower than 100° C.

From the viewpoint of the balance between the flowability and the grafted ratio of a modified propylene polymer, the organic peroxide (C) is preferably at least one compound selected from the group consisting of diacyl peroxide compounds, compounds (b1) having a structure represented by the following structural formula (1), and compounds (b2) having a structure represented by the following structural formula (2).

[Formula 1]

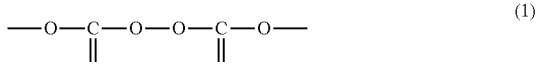
(1)

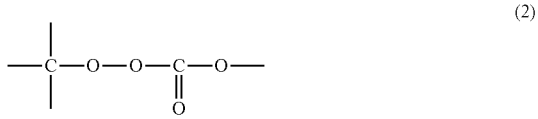
(2)

Examples of the diacyl peroxide compounds include dibenzoyl peroxide, diisobutyryl peroxide, di(3,5,5-trimethylhexanoyl)peroxide, di(4-methylbenzoyl)peroxide, and didodecanoyl peroxide.

Examples of the compounds (b1) having a structure represented by the following structural formula (1) include dicetyl peroxydicarbonate, di-3-methoxybutyl peroxydicarbonate, di-2-ethylhexyl peroxydicarbonate, bis(4-tert-butylcyclohexyl)peroxydicarbonate, diisopropyl peroxydicarbonate, tert-butylperoxyisopropyl carbonate, and dimyristyl peroxycarbonate.

Examples of the compounds (b2) having a structure represented by the following structural formula (2) include 1,1,3,3-tetramethylbutyl neodecanoate, α-cumylperoxy neodecanoate, and tert-butylperoxy neodecanoate.

The added amount of the organic peroxide (C) is from 0.01 to 20 parts by weight, preferably from 0.01 to 10 parts by weight, and more preferably from 0.1 to 5 parts by weight relative to 100 parts by weight of the propylene polymer (A). If the added amount is less than 0.01 parts by weight, the grafted ratio of the resulting modified propylene polymer to be obtained may lower. If the added amount exceeds 20 parts by weight, the melt flow rate of the modified propylene polymer may change greatly compared with the melt flow rate of the propylene polymer before the modification.

<Additives>

Conventional additives may be used for the production of a modified propylene polymer according to the present invention. Examples of the additives include a neutralizer, an antioxidant, a UV absorber, a lubricant, an antistatic agent, an antiblocking agent, a processing aid, a coloring agent, a foaming agent, a foam nucleating agent, a plasticizer, a flame retardant, a crosslinking agent, a crosslinking aid, a brightening agent, an antibacterial agent, and a light diffusing agent. Such additives may be used singly or two or more of them may be used in combination.

The resin composition according to the present invention may contain a resin or a rubber other than the above-described propylene polymer (A).

Examples thereof include ABS (copolymerized acrylonitrile/butadiene/styrene) resin, AAS (copolymerized special acrylic rubber/acrylonitrile/styrene) resin, ACS (copolymerized acrylonitrile/chlorinated polyethylene/styrene) resin, polychloroprene, chlorinated rubber, poly(vinyl chloride), poly(vinylidene chloride), fluororesin, polyacetal, polysulfone, polyetheretherketone, and polyethersulfone.

[Heat Treatment Step]

The heat treatment step is a step of subjecting a mixture obtained by the above-described mixing step to heat treatment at a prescribed temperature by using an extruder. By performing heat treatment using an extruder, the organic peroxide (C) in the mixture decomposes and a free radical formed by the decomposition reacts with the propylene polymer (A) and a free radical generated in the propylene polymer (A) reacts with an ethylenically unsaturated bond-containing compound (B), so that it becomes possible to obtain a modified propylene polymer.

The heat treatment temperature is a temperature lower than the decomposition temperature of the organic peroxide (C) at which the half-life thereof becomes 1 minute, and it is preferably from the glass transition temperature of the propylene polymer (A) to the decomposition temperature of the organic peroxide (C) at which the half-life thereof becomes 1 minute, more preferably from the glass transition temperature of the propylene polymer (A) to 100° C., and even more preferably from 20 to 80° C. If the heat treatment temperature exceeds the decomposition temperature of the organic peroxide (C) at which the half-life thereof becomes 1 minute, the propylene polymer (A) will decompose, so that the melt flow rate of the resulting modified propylene polymer will become high. The load to be applied to an extruder can be reduced by adjusting the heat treatment temperature to 20° C. or higher. The heat treatment temperature as used in the present invention is the temperature of the cylinder (the temperature of the kneading part) of an extruder.

The heat treatment time (the residence time of resin in an extruder) is from 0.1 to 30 minutes and preferably from 0.5 to 10 minutes.

Example of extruders that can be as the extruder to be used in the heat treatment step include a single screw extruder, a twin screw extruder, a multi-screw extruder, and the like and, in addition, a kneader, a Banbury mixer, a Brabender plastograph, and the like. Moreover, an extruder having a solid phase shear region like those disclosed in U.S. Pat. Nos. 4,607,797 and 6,494,390 and an extruder having a melt kneading region in addition to a solid phase shear region like that disclosed in JP 2005-281379 A may be used.

Furthermore, a high shear kneading machine equipped with an internal feedback screw can be used (see JP 2005-313608 A). In particular, it is preferred to use an extruder by which production can be done continuously. Two or more types of extruders selected from among the above may be used together. For example, it is permitted to separate a kneading step and an extrusion step with two types of extruders arranged consecutively (tandem type, etc.). An extruder having two or more raw material feed port may be used.

The extruder preferably has a raw material feed part, a kneading part, a vent part, and an extrusion part. From the viewpoint of productivity, the cylinder temperature of the vent part and the extrusion part is preferably from 100 to 300° C., more preferably from 140 to 250° C. From the viewpoint of the removal of heat generated by shearing, it is preferred that the screw and the cylinder can be cooled with a refrigerant, such as water.

From the viewpoint of molding processability, the melt flow rate, measured at 230° C. under a load of 2.16 kg (measured in accordance with JIS K7210), of the modified propylene polymer to be obtained via the above-described process is preferably from 0.1 to 400 g/10 minutes, more preferably from 0.5 to 300 g/10 minutes, and even more preferably from 1 to 200 g/10 minutes.

The ratio (MFR1/MFR2) of the melt flow rate (MFR1) of the modified propylene polymer to the melt flow rate (MFR2) of the propylene polymer (A) is preferably greater than 0 and smaller than 2, more preferably greater than 0.5 and smaller than 2, and even more preferably not smaller than 1 and smaller than 2.

The grafted ratio of the ethylenically unsaturated bond-containing compound (B) to the propylene polymer (A), i.e., modification ratio, is preferably from 0.1 to 10% by weight, more preferably from 0.1 to 5% by weight, and even more preferably from 0.1 to 1% by weight.

The value determined using the infrared absorption spectrum of the modified propylene polymer is used as the modification ratio in the present invention.

Modified propylene polymers to be obtained using the method according to the present invention can be used singly and can be used for a wide variety of applications in fields such as the industrial component field such as automobiles and household electric appliances, the wrapping filed such as films and sheets, the container field, and the fiber field.

EXAMPLES

The present invention is further described below with reference to Examples and Comparative Examples. The propylene polymers (A), ethylenically unsaturated bond-containing compound (B), and organic peroxide (C) used in the Examples and the Comparative Examples are given below.

Propylene Polymer (A)
(A-1) Propylene Homopolymer
  Melt flow rate (at 230° C. under a load of 2.16 kg): 18 g/10 minutes
  Intrinsic viscosity ($[\eta]$): 1.34 dl/g
(A-2) Propylene Homopolymer
  Melt flow rate (at 230° C. under a load of 2.16 kg): 105 g/10 minutes
  Intrinsic viscosity ($[\eta]$): 0.93 dl/g
Ethylenically Unsaturated Bond-containing Compound (B)
  Compound name: Maleic anhydride (MAH)
Organic Peroxide (C)
  Compound name: Dicetyl peroxydicarbonate
  Decomposition temperature at which the half-life becomes 1 minute: 99° C.

The physical properties of raw material components and modified propylene polymers were measured in accordance with the methods given below.

(1) Melt Flow Rate (MFR; Unit: g/10 Minutes)

The melt flow rates of raw material components and modified propylene polymers were measured in accordance with the method provided in JIS K7210. The measurement was performed at a temperature of 230° C. under a load of 2.16 kg.

(2) Melt Flow Rate Ratio (MFR Ratio)

The value obtained by dividing the melt flow rate of a modified propylene polymer measured by the method disclosed in the above (1) by the melt flow rate of a propylene polymer (A) was used as the ratio of the melt flow rate of the modified propylene polymer to the melt flow rate of the propylene polymer (A).

(3) Intrinsic Viscosity ($[\eta]$, Unit: dl/g)

The intrinsic viscosity of a raw material component was measured in the following procedures. First, reduced viscosities were measured at three concentrations of 0.1, 0.2 and 0.5 g/dl by using a Ubbelohde's viscometer. Then, the intrinsic viscosity was determined by an extrapolation method in which reduced viscosities are plotted against concentrations and the concentration is extrapolated to zero as described before. The measurement was carried out in tetralin of 135° C.

(4) Modification Ratio with Maleic Anhydride (% by Weight)

The modified propylene polymer (1.0 g) obtained in each of the Examples and the Comparative Examples was dissolved in 100 ml of xylene. This solution was dropped into 1000 ml of methanol under stirring and then a modified propylene polymer reprecipitated was collected. The modified propylene polymer collected was vacuum dried (at 80° C. for 8 hours) and a film of about 100 μm in thickness was produced by heat pressing. The infrared absorption spectrum of the thus-produced film was measured and the absorbance of a characteristic absorption of the resulting infrared absorption spectrum was corrected with the thickness of the sheet used for the measurement. Then, a modification ratio with maleic anhydride was determined by a calibration curve method on the basis of the corrected absorbance. A peak of 1780 $cm^{-1}$ was used as the characteristic absorption of maleic anhydride.

Example 1

Comparative Example 1

A modified propylene polymer was obtained by uniformly mixing a propylene polymer (A) and an organic peroxide (C), followed by performing heat treatment under the condition given in Table 1 using an extruder. A single screw extruder was used as the extruder. The preset temperature of the cylinder was 80° C. and the preset screw rotation speed was 75 rpm. The blend ratio of the propylene polymer (A) and the organic peroxide (C) and the physical properties of the resulting modified propylene polymer are given in Table 1.

Examples 2 to 5

Comparative Example 2

Modified propylene polymers were obtained in the same way as Example 1 except for setting the preset temperature of the cylinder to 40° C. and setting the screw rotation speed to 65 rpm in the respective examples. Physical properties of the resulting modified propylene polymers are shown in Table 1.

Comparative Examples 3 to 8

As an extruder, modified propylene polymers were obtained in the same way as Example 1 except for using a twin screw extruder (Model TEX44αII-49BW-3V, manufactured by The Japan Steel Works, Ltd.) as an extruder. The cylinder temperature of the extruder was adjusted to 200° C. and the screw rotation speed was adjusted to 200 rpm.

TABLE 1

|  | (A-1) part by weight | (A-2) part by weight | (B) part by weight | (C) part by weight | Heat treatment temperature | MFR g/10 minutes | MFR ratio | Modification ratio % by weight |
|---|---|---|---|---|---|---|---|---|
| Example 1 | 100 |  | 2 | 1 | 80 | 21.6 | 1.20 | 0.12 |
| Example 2 | 100 |  | 2 | 1 | 40 | 24.4 | 1.36 | 0.14 |
| Example 3 | 100 |  | 2 | 2 | 40 | 21.5 | 1.19 | 0.24 |
| Example 4 |  | 100 | 2 | 1 | 40 | 138 | 1.31 | 0.13 |
| Example 5 |  | 100 | 2 | 2 | 40 | 153 | 1.46 | 0.25 |
| Comparative Example 1 | 100 |  | 2 |  | 80 | 19.9 | 1.11 | 0.01 |
| Comparative Example 2 | 100 |  | 2 |  | 40 | 20.7 | 1.15 | 0.02 |
| Comparative Example 3 | 100 |  |  |  | 200 | 17.8 | 1.00 | 0.00 |
| Comparative Example 4 | 100 |  | 2 | 1 | 200 | 91.7 | 5.09 | 0.10 |
| Comparative Example 5 | 100 |  | 2 | 2 | 200 | 94.6 | 5.26 | 0.20 |
| Comparative Example 6 | 100 |  | 2 | 1 | 200 | 563 | 31.3 | 0.30 |
| Comparative Example 7 |  | 100 | 2 | 1 | 200 | 360 | 3.43 | 0.10 |
| Comparative Example 8 |  | 100 | 2 | 2 | 200 | 349 | 3.32 | 0.19 |

What is claimed is:

1. A method for producing a modified propylene polymer, the method comprising a heat treatment step of subjecting a mixture comprising 100 parts by weight of a propylene polymer (A), from 0.1 to 50 parts by weight, based on said 100 parts by weight, of an ethylenically unsaturated bond-containing compound (B), and from 0.01 to 20 parts by weight, based on said 100 parts by weight, of an organic peroxide (C) whose decomposition temperature at which the half-life thereof becomes 1 minute is lower than 120° C., to heat treatment by using an extruder at a temperature up to 40° C.

2. The method for producing a modified propylene polymer according to claim 1, wherein the ethylenically unsaturated bond-containing compound (B) is an unsaturated carboxylic acid and/or a derivative thereof.

3. The method for producing a modified propylene polymer according to claim 1, wherein the organic peroxide (C) is at least one compound selected from the group consisting of diacyl peroxide compounds, compounds (b1) having a structure represented by the following structural formula (1), and compounds (b2) having a structure represented by the following structural formula (2)

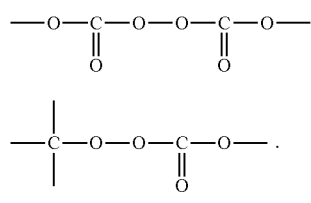

4. The method for producing a modified propylene polymer according to claim 1, wherein the organic peroxide (C) is dicetyl peroxydicarbonate.

5. The method for producing a modified propylene polymer according to claim 2, wherein the organic peroxide (C) is at least one compound selected from the group consisting of diacyl peroxide compounds, compounds (b1) having a structure represented by the following structural formula (1), and compounds (b2) having a structure represented by the following structural formula (2)

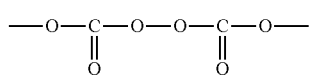

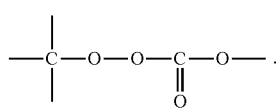

6. The method for producing a modified propylene polymer according to claim 2, wherein the organic peroxide (C) is dicetyl peroxydicarbonate.